United States Patent
Zhang et al.

(10) Patent No.: US 9,472,811 B2
(45) Date of Patent: *Oct. 18, 2016

(54) GRAPHITE PARTICLE-SUPPORTED PT-SHELL/NI-CORE NANOPARTICLE ELECTROCATALYST FOR OXYGEN REDUCTION REACTION

(75) Inventors: Junliang Zhang, Rochester, NY (US); Zhongyi Liu, Troy, MI (US); Zhiqiang Yu, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1057 days.

This patent is subject to a terminal disclaimer.

(21) Appl. No.: 13/027,911

(22) Filed: Feb. 15, 2011

(65) Prior Publication Data

US 2012/0208108 A1   Aug. 16, 2012

(51) Int. Cl.
*H01M 4/88* (2006.01)
*H01M 4/92* (2006.01)
(Continued)

(52) U.S. Cl.
CPC ........ *H01M 4/9083* (2013.01); *C23C 18/1635* (2013.01); *C23C 18/1651* (2013.01); *C23C 18/1879* (2013.01); *C23C 18/1882* (2013.01); *C23C 18/32* (2013.01); *C23C 18/36* (2013.01); *C23C 18/54* (2013.01); *H01M 4/8657* (2013.01); *H01M 4/921* (2013.01); *H01M 4/926* (2013.01); *H01M 2008/1095* (2013.01); *Y02E 60/50* (2013.01)

(58) Field of Classification Search
CPC .............. C23C 18/16; C23C 18/1635; C23C 18/1879; C23C 18/1882; H01M 4/9083

USPC ............... 502/326, 339; 429/523, 524, 525; 977/810, 840, 902
See application file for complete search history.

(56) References Cited

U.S. PATENT DOCUMENTS 3,011,920 A * 12/1961 Shipley, Jr. ................... 106/1.11
4,427,502 A *  1/1984 Abys ............................ 205/242
(Continued)

FOREIGN PATENT DOCUMENTS

CN    101516550 A    8/2009
CN    101733134 A    6/2010
(Continued)

OTHER PUBLICATIONS

Zhang, J. et al., "Platinum Monolayer Electrocatalysts for O2 Reduction: Pt Monolayer on Pd(111) and on Carbon-Supported Pd Nanoparticles," J. Phys. Chem. B., 108(3): pp. 10955-10964, 2004.
(Continued)

*Primary Examiner* — Jun Li
(74) *Attorney, Agent, or Firm* — Brooks Kushman P.C.

(57) ABSTRACT

A method for forming an electrocatalyst for fuel cell applications comprises electrolessly depositing a first plurality of nickel particles onto carbon-support particles. The nickel particles are formed from a nickel ion-containing aqueous solution. At least a portion of the nickel particles are replaced with platinum via a galvanic displacement reaction to form a second plurality of nickel particles coated with a platinum layer. During this displacement reaction step, the nickel particles are heated to a temperature sufficient to form the platinum layer. Finally, the second plurality of nickel particles is optionally incorporated into a cathode layer of a fuel cell.

20 Claims, 7 Drawing Sheets

(51) Int. Cl.
*H01M 8/02* (2016.01)
*H01M 4/90* (2006.01)
*H01M 4/86* (2006.01)
*C23C 18/16* (2006.01)
*C23C 18/18* (2006.01)
*C23C 18/32* (2006.01)
*C23C 18/36* (2006.01)
*C23C 18/54* (2006.01)
*H01M 8/10* (2016.01)

(56) References Cited

U.S. PATENT DOCUMENTS

| | | |
|---|---|---|
| 2006/0257719 A1 | 11/2006 | Merzougui et al. |
| 2010/0086832 A1* | 4/2010 | Lopez et al. .................... 429/44 |
| 2010/0105548 A1 | 4/2010 | Zhang et al. |
| 2011/0014550 A1* | 1/2011 | Jiang et al. .................. 429/528 |

FOREIGN PATENT DOCUMENTS

| | | | | |
|---|---|---|---|---|
| IT | WO2008/009742 | * | 1/2008 | ............ B01J 21/18 |
| WO | 2008/009742 A1 | | 1/2008 | |
| WO | 2008/025750 A1 | | 3/2008 | |

OTHER PUBLICATIONS

Schmidt, T.J. et al., "Characterizatoin of High-Surface-Area Electrocatalysts Using a Rotating Disk Electrode Configuration," J. Electrochem. Soc., 145(7): pp. 2354-2358, 1998.

Dun, S. et al., "Galvanic Replacement Strategy for a Core-Shell Like Ni—Pt Electrocatalyst with High Pt Utilization", Acta Phys.—Chim. Sin., 2010, pp. 1219-1224.

Yubing, L. et al., "Study on Phthalocyanine Catalysts for Cathode of a Proton Exchange Membrane Fuel Cell", Petrochemical Technology, 2004, pp. 1232-1233 and English Abstract.

* cited by examiner

GRAPHITE PARTICLE-SUPPORTED PT-SHELL/NI-CORE NANOPARTICLE ELECTROCATALYST FOR OXYGEN REDUCTION REACTION

BACKGROUND OF THE INVENTION

1. Field of the Invention

The present invention is related to electrocatalysts used for fuel cell applications.

2. Background

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

Reducing the Pt loading and improving the ORR activity of the cathode catalyst has become one of the most difficult challenges on the road of commercializing the PEM fuel cell vehicle. Graphite particles supported core-shell electrocatalysts containing a continuous thin layer of Pt or Pt alloy shell overlaid on non-noble metal substrate particles can potentially overcome this critical challenge.

Accordingly, there is a need for improved methodology for applying hydrophilic coatings at the surfaces of bipolar plates used in fuel cell applications.

SUMMARY OF THE INVENTION

The present invention solves one or more problems of the prior art by providing in at least one embodiment a method for preparing a core shell electrocatalyst. The method comprises electrolessly depositing uncoated nickel particles onto carbon-support particles. The nickel particles are formed from a nickel ion-containing aqueous solution. At least a portion of the uncoated nickel particles are replaced with platinum via a galvanic displacement reaction to form platinum-coated nickel particles. During this displacement reaction step, the nickel particles are heated to a temperature sufficient to form the platinum layer. Finally, the platinum-coated nickel particles are optionally incorporated into a cathode layer of a fuel cell. The present invention produces core-shell particles in which a platinum shell overlays nickel nanoparticles. Advantageously, the platinum mass activity of such catalysts formed by the present method is 3 to 4 times the activities obtained from Pt/Vulcan catalysts.

DETAILED DESCRIPTION OF THE PREFERRED EMBODIMENT(S)

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
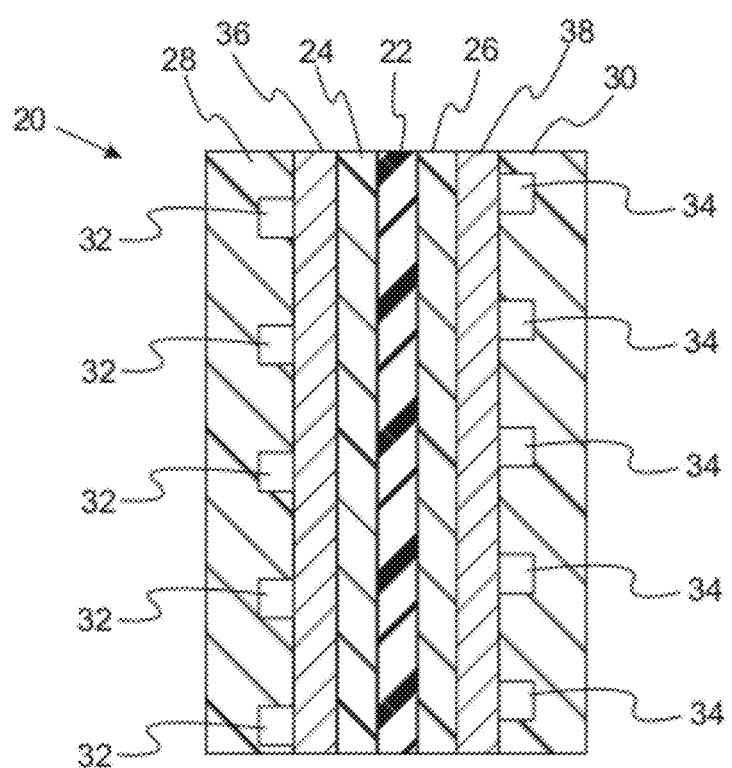
FIG. 1 is a cross sectional view of a fuel cell incorporating the bipolar plates of an embodiment of the present invention.

With reference to FIG. 1, a cross sectional view of a fuel cell that incorporates an embodiment of a flow field plate is provided. PEM fuel cell 20 includes polymeric ion conducting membrane 22 disposed between cathode catalyst layer 24 and anode catalyst layer 26. Fuel cell 20 also includes electrically conductive flow field plates 28, 30 which include gas channels 32 and 34. Flow field plates 28, 30 are either bipolar plates (illustrated) or unipolar plates (i.e., end plates). In a refinement, flow field plates 28, 30 are formed from a metal plate (e.g., stainless steel) optionally coated with a precious metal such as gold or platinum. In another refinement, flow field plates 28, 30 are formed from conducting polymers which also are optionally coated with a precious metal. Gas diffusion layers 36 and 38 are also interposed between flow field plates and a catalyst layer. Advantageously, flow field plates 28, 30 are made by the processes set forth below.

Figure 2A:
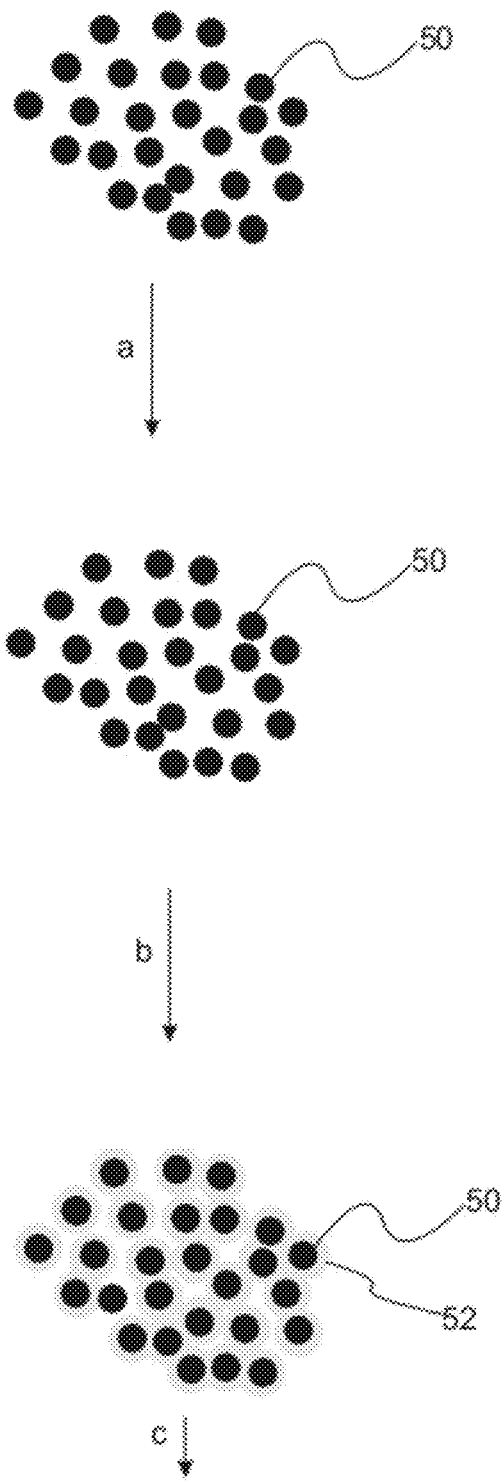
FIGS. 2A, 2B, and 2C provide a schematic flowchart illustrating a method for making an electrocatalyst for fuel cell applications.
Figure 2B:
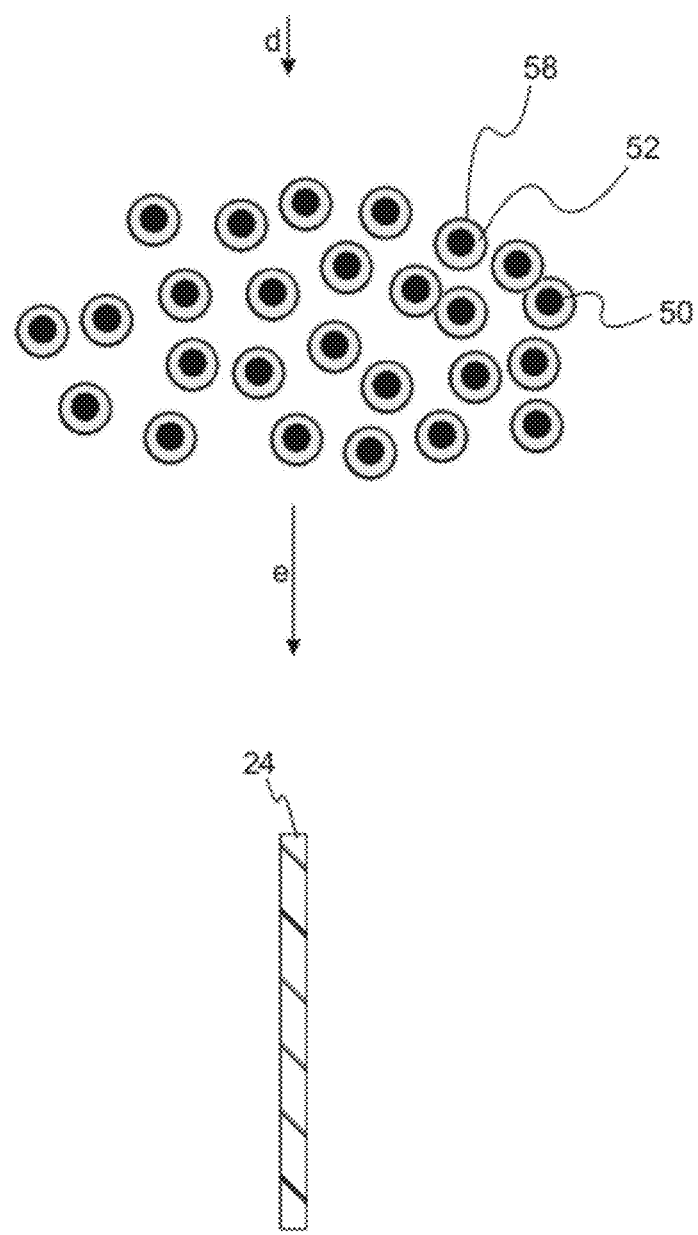
Figure 2C:
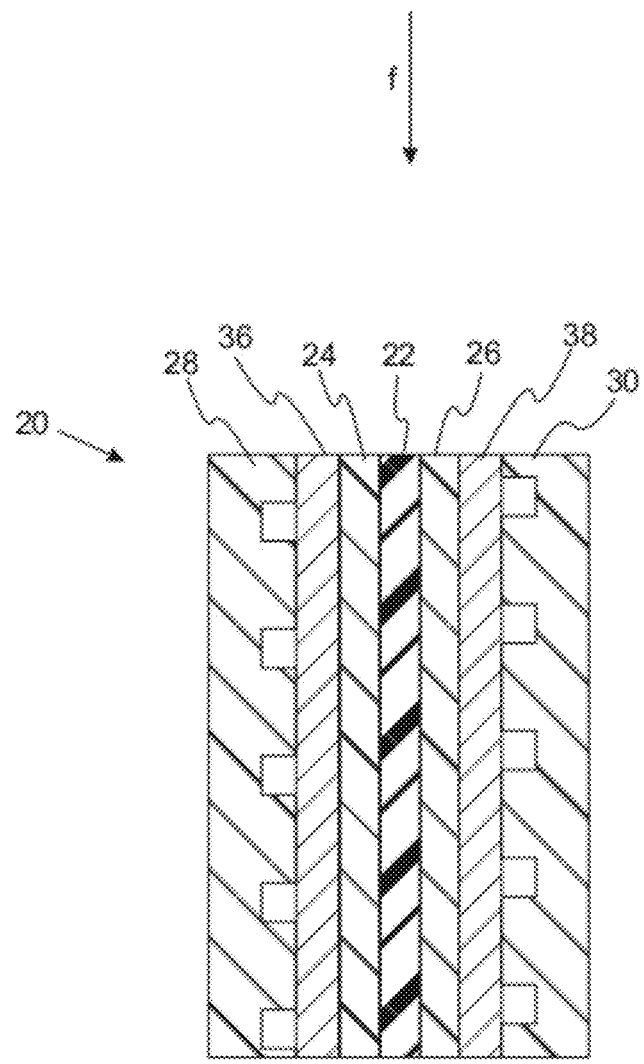

With reference to FIG. 2, a flowchart illustrating the formation of an electrocatalyst is provided. In step a), carbon-containing particles 50 are cleaned and then activated by contact with an acidic solution. Graphite particles are found to be particularly useful for forming the electrocatalysts. In a variation, the graphite particles are characterized by a spatial dimension from about 10 nm to 1.2 microns. In another variation, the nickel particles have a spatial dimension from about 50 to about 200 nanometers. In still another variation, nickel particles have a spatial dimension from about 70 to about 100 nanometers. As used herein, when a value is given for the spatial dimension of particles, such a dimension is the diameter of a sphere having a volume equal to the average volume of the particles. In a refinement, the spatial dimension means that the particles do not have any spatial dimension of greater value. For spherical particles, the characteristic spatial dimension is simply the diameter. In a refinement, the carbon-containing particles are activated by heat treatment with aqueous $HNO_3$. In another refinement, the activation is accomplished by contacting carbon-containing particles 50 with a $SnCl_2/HCl$ solution. Typically, the activation step is performed at an elevated temperature from about 50 to 100° C. for several hours (i.e., 1 to 10 hours).

In the next step b), nickel (e.g. uncoated nickel particles 52) is deposited on the carbon particles by contacting the carbon-containing particles 50 with an electroless reaction solution. Electroless in the present context means that the nickel particles are formed without passing an electric current through the solution. Electroless reaction solution includes a nickel ion-containing (e.g., $Ni^{2+}$) aqueous solution. This electroless reaction solution is reacted with a reducing agent. The nickel ions are typically formed by dissolving a nickel salt into a water-containing solution. Examples of suitable nickel salts include, but are not limited to, nickel chloride, nickel sulfate, nickel sulfamate, nickel acetate, nickel hypophosphite, and combinations thereof. Examples of suitable reducing agents include, but are not limited to, sodium hypophosphite, sodium borohydride and dimethylamineborane.

The pH of the electroless reaction solution is adjusted to a pH that is greater than about 7. In another variation, the pH of the electroless reaction solution is adjusted to a pH from about 8 to about 11. In still another variation, the pH of the electroless reaction solution is adjusted to a pH from about 8 to about 10. In yet another variation, the pH of the electroless reaction solution is adjusted to a pH of about 9.

The chemical reactions leading to the formation of the nickel particles is described by the following reactions:

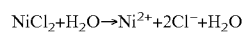

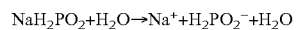

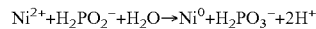

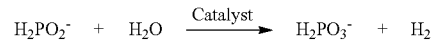

In step c), the nickel particles/carbon-support particles are transferred to a high boiling organic solvent and heated to an elevated temperature for several hours (i.e., 1 to 5 hours). Typically, the particles are heated to a temperature from about 130° C. to 230° C.

In step d), the nickel particles/carbon-support particles are subjected to a galvanic displacement reaction in which at least a portion of the nickel particles are replaced with platinum to form a second plurality of nickel particles coated with platinum layer 58. During this step, a platinum ion-containing solution is contacted with the nickel particles/carbon-support particles. The platinum ion containing solution is formed by dissolving a platinum-containing compound in a solvent. Examples of suitable platinum containing compounds include, but are not limited to $K_2PtCl_4$, $H_2PtCl_4$, $H_2PtCl_6$, $(NH_3)_2Pt(NO_2)_2$, $(NH_3)_2PtCl_2$, $Pt(acac)_2$, $Pt(C_2H_3O_2)_2$, and hydrated forms thereof, and combinations thereof. The platinum ion-containing solution is heated to a temperature sufficient to form the platinum layer. Typically, during this step the nickel particles are heated to a temperature that is less than about 150° C. typically for 1 to 2 hours.

In one variation, the platinum layer has a thickness from about 1 to about 10 nanometers. In another variation, the platinum layer has a thickness from about 2 to about 3 nanometers. In step e), the second plurality of nickel particles is optionally incorporated into cathode layer 24. In a refinement, the second plurality of nickel particles are incorporated into an ink from which an electrocatalyst layer is formed (e.g. cathode layer). In a further refinement, the ink is printed onto the ion conducting polymeric membrane. U.S. Pat. Appl. No. 20060257719 provided methods for forming such inks with platinum loaded carbon powders which can be adapted for this purpose. The entire disclosure of this application is hereby incorporated by reference. Typically, the loading of the nickel particles is such that the platinum loading is from about 10 $\mu gPt/cm^2$ to about 400 $\mu gPt/cm^2$. In a refinement, the nickel particles are such that the platinum loading is from about 20 $\mu gPt/cm^2$ to about 200 $\mu gPt/cm^2$. In another refinement, the nickel particles are such that the platinum loading is from about 50 $\mu gPt/cm^2$ to about 100 µgPt/cm². Finally, the cathode layer is then incorporated into fuel cell 20.

The following examples illustrate the various embodiments of the present invention. Those skilled in the art will recognize many variations that are within the spirit of the present invention and scope of the claims.

About 2 grams of large graphite particles (average size ~0.7-1 microns) (Graphite 4827, from Ashbury, N.J., USA) are cleaned with acetone. The graphite surfaces are activated by heat treatment in a 500 ml ($SnCl_2$+HCl) solution, which contains 10 g/l $SnCl_2$ and 30 ml/l concentrated HCl. The graphite particles are soaked in the ($SnCl_2$+HCl) solution and magnetically stirred for 30 minutes. After washing and filtering with copious amounts of deionized (DI) water (Millipore®), the carbon particles are transferred into a Ni deposition bath which contains a mixed solution of $NiCl_2$, $NaH_2PO_2$, and $Na_3C_6H_5O_7$. The pH is adjusted to be 9 by using $(NH_4)Cl$. The deposition of Ni particles occurs at about 80° C. By controlling the deposition time and pH, different sizes of Ni particles can be achieved. Higher pH and shorter time tends to give smaller Ni particles. After Ni particle deposition, the mixture is washed and transferred to an ethylene glycol solution. The mixture is then heated to 180° C. and held at 180° C. for 2 hours. After cooling, a pre-prepared Pt precursor $K_2PtCl_4$ in ethylene glycol solution is added into the mixture and stirred for 2 hours. Then the solution is heated to 130° C. for 2 hours. After cooling, the particles are washed and dried. The resulting Pt-shell/Ni-core particles have a 2-3 nm thick Pt-shell overlaid on 70-100 nm Ni particles. The Pt mass activity of the catalyst is measured on RDE to be 3 to 4 times the activity of a Pt/Vulcan baseline catalyst.

Figure 3:
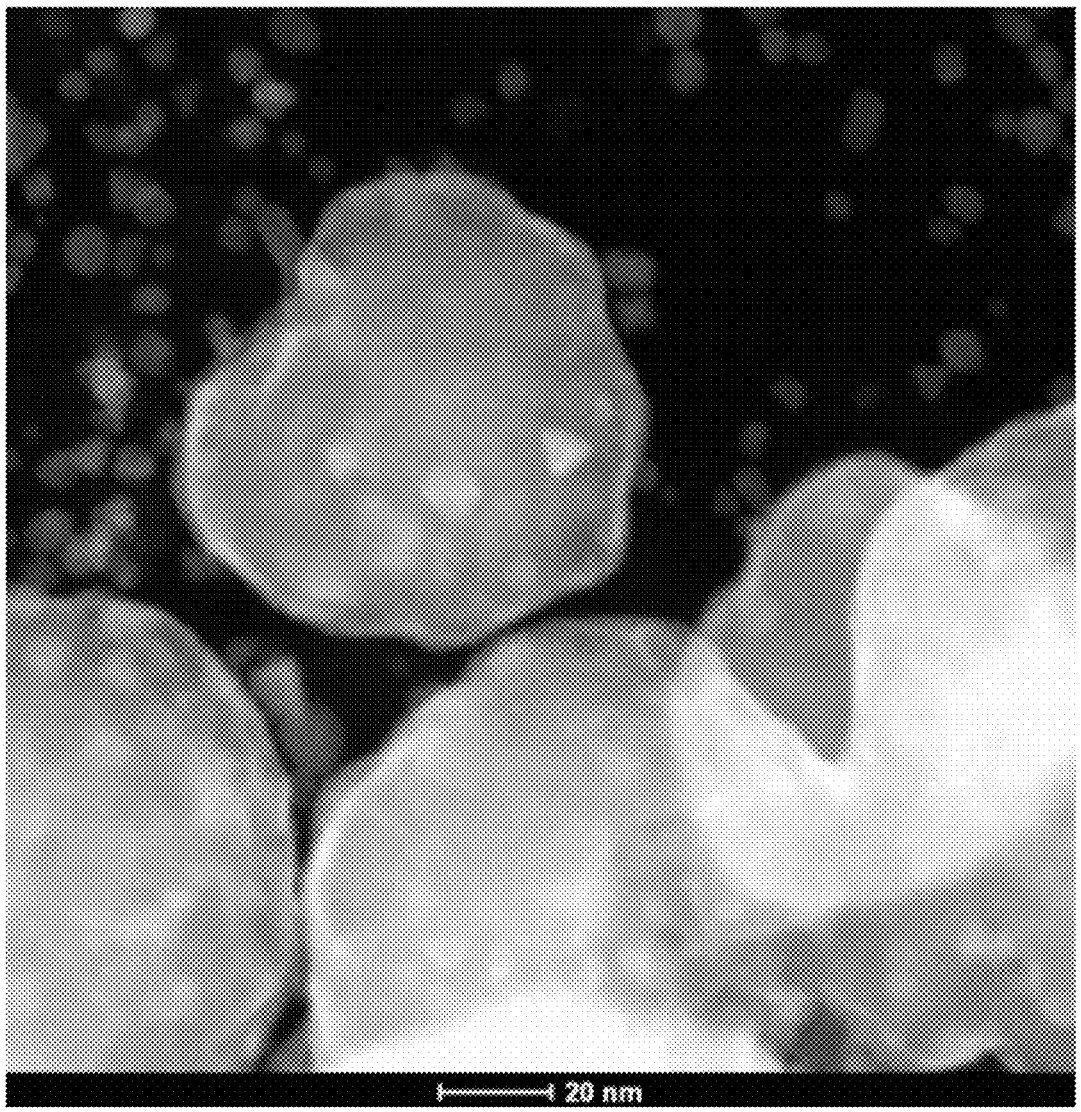
FIG. 3 provides a TEM image of synthesized Pt-shell/Ni-core particles supported on graphite.
Figure 4:
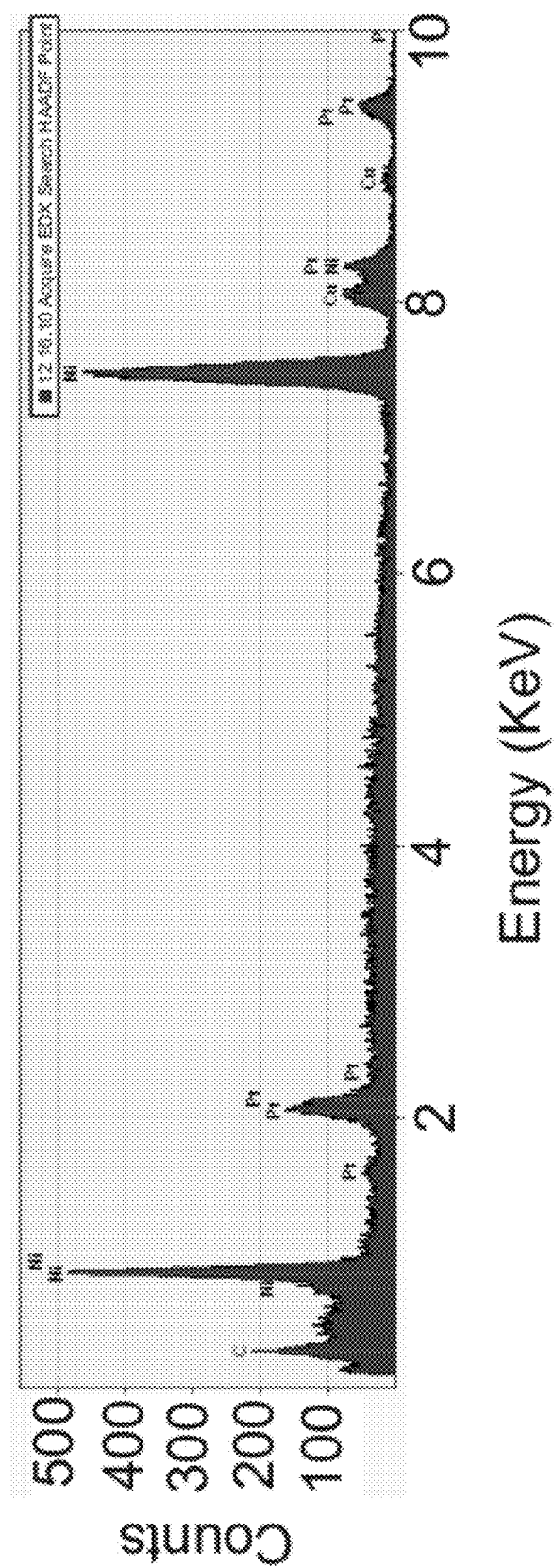
FIG. 4 shows TEM-EDX spectroscopy of the particles shown in FIG. 3.
Figure 5:
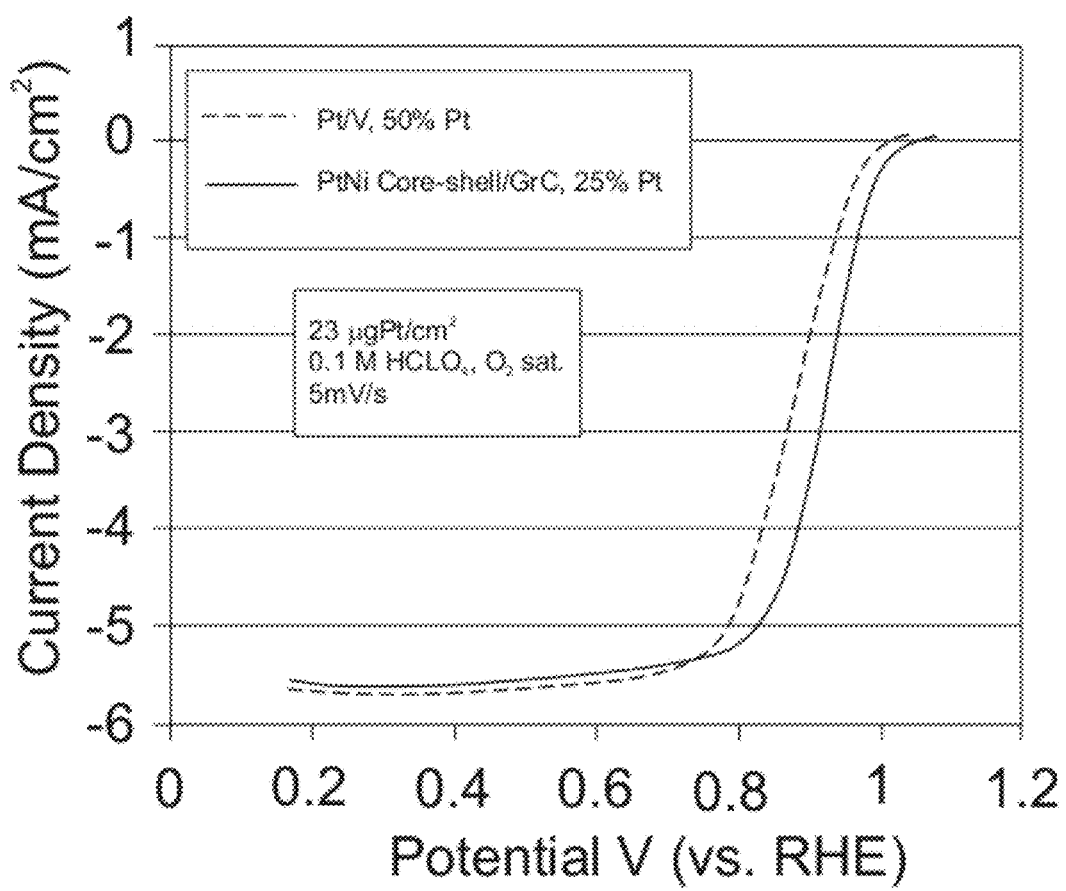
FIG. 5 provides polarization curves tested on a rotating disk electrode.

FIG. 3 provides a Z-contrast TEM image of the synthesized Pt-shell/Ni-core particles supported on graphite. The Z-contrast image advantageously distinguishes Pt- from Ni-atoms. On the image of the particles, the brighter edge within the range of 2-3 nm thick is evidence of a Pt-shell deposited on the Ni core particles. The overall particle size is around 70-100 nm. FIG. 4 shows the TEM-EDX spectroscopy of the particles shown in FIG. 3. In this figure, the particles are observed to be predominately Ni with a lesser amount Pt. This observation is in agreement with the image shown in FIG. 3. FIG. 5 provides polarization curves tested on a rotating disk electrode ("RDE"). The details of preparation of catalyst layer on the RDE electrode can be found in Schmidt T J, Gasteiger H A, Stab G D, Urban P M, Kolb D M, Behm R J (1998) *Characterization of high-surface area electrocatalysts using a rotating disk electrode configuration*. J. Electrochem. Soc., 145(7): p. 2354-2358 and Zhang J, Mo Y, Vukmirovic M B, Klie R, Sasaki K, Adzic R R (2004) *Platinum monolayer electrocatalysts for $O_2$ reduction: Pt monolayer on Pd(111) and on carbon-supported Pd nanoparticles*. J. Phys. Chem. B, 108(30): p. 10955-10964. The Pt loading on the RDE electrode was adjusted to be 23 ug Pt/cm². The test was carried out in 0.1M $HClO_4$ solution saturated with $O_2$, and the scan rate was 5 mV/s. The measured Pt mass activity of the Pt-shell/Ni-core catalyst at 0.9V was 0.48 A/mg Pt (calculated from the solid polarization curve). Compared to the mass activity of 0.13 A/mg Pt for the standard 50% Pt/V (50 wt. % Pt/Vulcan carbon, from TKK, Japan) (calculated from the dashed polarization curve), this is a more than 3 times enhancement in mass activity.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for forming an electrocatalyst for use in a fuel cell, the method comprising:
   a) activating a plurality of carbon-support particles by contacting the carbon support particles with an acid solution;
   b) electrolessly depositing uncoated nickel particles onto carbon-support particles, the nickel particles being formed from an aqueous nickel ion-containing solution;
   c) replacing at least a portion of the nickel particles with platinum via a galvanic displacement reaction to form platinum-coated nickel particles wherein the nickel particles are heated to a predetermined temperature sufficient to form a platinum layer; and
   d) incorporating the platinum-coated nickel particles into a cathode layer of the fuel cell.

2. The method of claim 1 wherein the nickel particles are heated for a predetermined period of time prior to step c).

3. The method of claim 1 wherein the carbon-support particles comprise graphite.

4. The method of claim 1 wherein the nickel particles have a spatial dimension from about 50 to about 200 nanometers.

5. The method of claim 1 wherein the nickel particles have a spatial dimension from about 70 to about 100 nanometers.

6. The method of claim 1 wherein the platinum layer has a thickness from about 1 to about 10 nanometers.

7. The method of claim 1 wherein the platinum layer has a thickness from about 2 to about 3 nanometers.

8. The method of claim 1 wherein the nickel particles are contacted with a platinum ion-containing solution in step c).

9. The method of claim 8 wherein the platinum ion containing solution is formed by dissolving a platinum-containing compound in a solvent, the platinum containing compound comprising a component selected from the group consisting of $K_2PtCl_4$, $H_2PtCl_4$, $H_2PtCl_6$, $(NH_3)_2Pt(NO_2)_2$, $(NH_3)_2PtCl_2$, $Pt(acac)_2$, $Pt(C_2H_3O_2)_2$, and their hydrated forms.

10. The method of claim 1 wherein the pH of the nickel ion-containing solution is adjusted to a pH greater than 7.

11. The method of claim 1 wherein the pH of the nickel ion-containing solution is adjusted to a pH from about 8 to about 10.

12. The method of claim 1 wherein the uncoated nickel particles are formed by reacting the nickel ion-containing solution with a reducing agent.

13. The method of claim 12 wherein nickel ions are formed by dissolving a nickel salt into a water containing solution, the nickel salt comprising a component selected from the group consisting of nickel chloride, nickel sulfate, nickel sulfamate, nickel acetate, nickel hypophosphite, and combinations thereof.

14. The method of claim 12 wherein the reducing agent is selected from the group consisting of sodium hypophosphite, sodium borohydride and dimethylamineborane.

15. A method for forming an electrocatalyst for use in a fuel cell, the method comprising:
   a) activating a plurality of carbon-support particles by contacting the carbon-support particles with an acid solution;
   b) electrolessly depositing uncoated nickel particles onto the carbon-support particles, the nickel particles being formed by reacting an aqueous nickel ion-containing solution with a reducing agent;

c) heating the nickel particles on the carbon-support particles to a temperature from about 150° C. to about 250° C. for a predetermined period of time;

d) replacing at least a portion of the nickel particles with platinum via a galvanic displacement reaction to form platinum-coated nickel particles, the platinum-coated nickel particles formed by contacting the nickel particles with a platinum ion-containing solution; and e) incorporating the platinum-coated nickel particles into a cathode layer of the fuel cell.

16. The method of claim 15 wherein the pH of the aqueous nickel ion-containing solution is adjusted to a pH from about 8 to about 10.

17. The method of claim 15 wherein the nickel particles have a spatial dimension from about 50 to about 200 nanometers.

18. The method of claim 15 wherein the platinum-coated nickel particles have a platinum layer with a thickness from about 2 to about 3 nanometers.

19. The method of claim 15 wherein uncoated nickel particles are formed by reacting the nickel ion-containing solution with a reducing agent.

20. The method of claim 19 wherein nickel ions are formed by dissolving a nickel salt into a water-containing solution, the nickel salt being selected from the group consisting of nickel chloride, nickel sulfate, nickel sulfamate, nickel acetate, nickel hypophosphite, and combinations thereof; and the reducing agent is selected from the group consisting of sodium hypophosphite, sodium borohydride and dimethylamineborane.

* * * * *